United States Patent [19]

Rutherford

[11] 4,335,521
[45] Jun. 22, 1982

[54] METHOD AND APPARATUS FOR GEOGRAPHIC LOCATION

[76] Inventor: Terry G. Rutherford, Rte. 5, Box 249, Candler, N.C. 28715

[21] Appl. No.: 163,300

[22] Filed: Jun. 26, 1980

[51] Int. Cl.³ .............................................. G01C 17/04
[52] U.S. Cl. .................................... 33/340; 33/1 SD; 33/1 N; 33/342; 33/355 R
[58] Field of Search .............. 33/342, 1 B, 1 C, 1 SD, 33/272, 274, 340, 1 N, 273, 355 R

[56] References Cited

U.S. PATENT DOCUMENTS

| | | | |
|---|---|---|---|
| 1,399,685 | 12/1921 | Boz | 33/340 |
| 2,015,627 | 9/1935 | Hug | 33/274 |
| 2,618,856 | 11/1952 | Sweet | 33/1 SD |
| 2,674,804 | 4/1954 | Reinhardt | 33/272 |
| 3,795,053 | 3/1974 | Burke | 33/1 B |
| 4,241,511 | 12/1980 | Frigano | 33/272 |

*Primary Examiner*—William D. Martin, Jr.

[57] ABSTRACT

This invention is directed to a method of determining and recording an indeterminate sequence of distance/-direction coordinates in a manner that permits the user or some other person to subsequently retrace the coordinates. Apparatus is disclosed to enable the user to record and retrace the coordinates with a high degree of precision.

2 Claims, 13 Drawing Figures

METHOD AND APPARATUS FOR GEOGRAPHIC LOCATION

Man has developed numerous techniques and devices for geographically locating himself in his surroundings. Outstanding landmarks have been used as reference points in travel within a locality when the relationships of the travel points to the landmarks have been known. Man has used the stars by night and sun by day as means of directing his travels. Magnetic attraction phenomena in the earth has also been discovered by man to assist him in his geographical movement.

Various techniques have also been developed for recording geographic landmarks to enable man to retrace directional travel he has experienced. Maps are prepared with known or ascertainable points of reference. Devices have been made to assist man in retracing "paths" along such maps. The device in U.S. Pat. No. 3,460,508, for example, is useful for locating a parked car in a city block gridwork.

BRIEF DESCRIPTION OF THE INVENTION

There is no known device, however, that it at once small, easy to use, not cumbersome, that permits one to record a sequence of directional/travel coordinates relative to a known factor. In the present invention, a user can record an indeterminate number of "minipaths" relative to a known condition and retrace those "minipaths" in moving from place to place.

The device herein and its method of use can be used in hiking and wilderness travel. It can be used in exploration of such areas to record the directions and distances moved so that they can be retraced to the point of origin. Further, the record can be preserved for later use by third parties.

The device can also be used in games, permitting the players to map out paths for location of objects, retrace paths for determining accuracy of movements, and so forth. Reference is made to the attached Figures for more detail of the invention herein.

BRIEF DESCRIPTION OF THE INVENTION

DETAILED DESCRIPTION OF THE DRAWINGS

Figure 1:
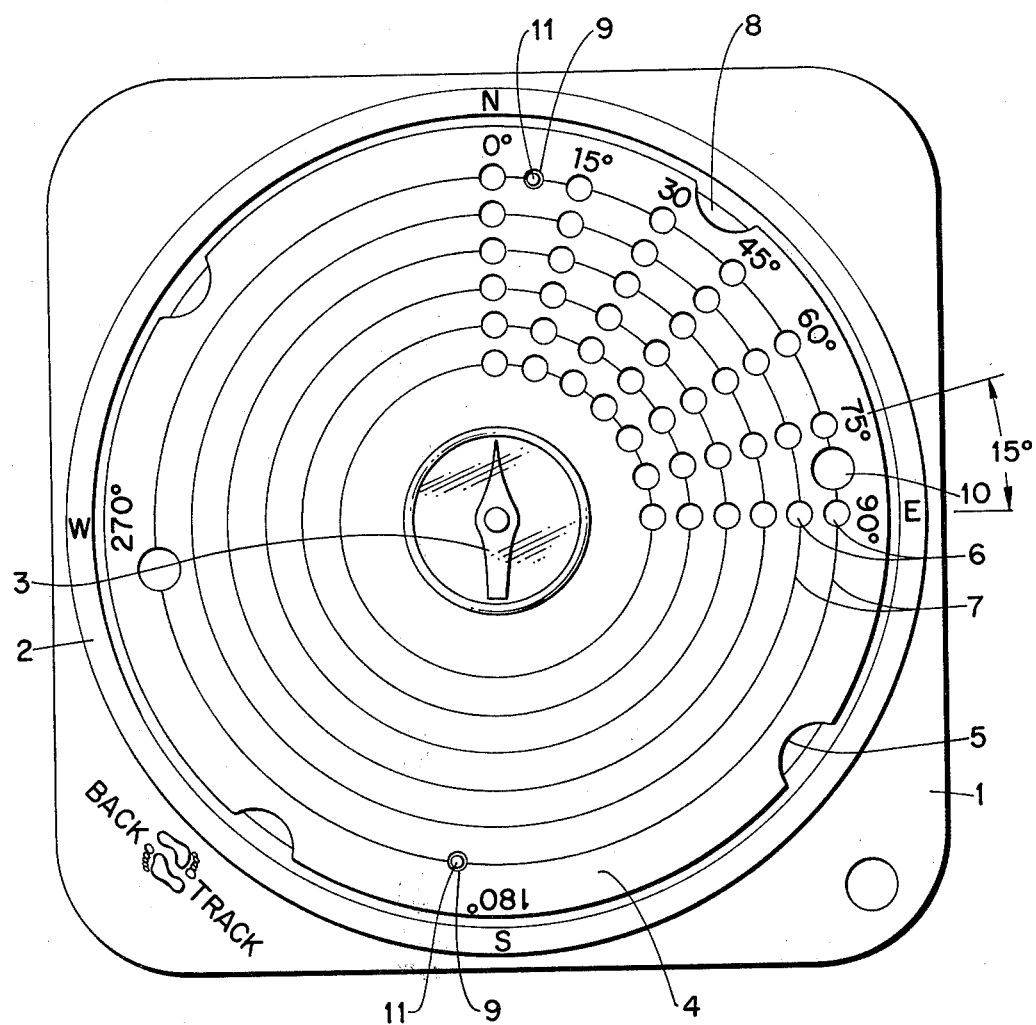
FIG. 1 is a plan view of an embodiment of the invention showing marking hole and compass layout.
Figure 2:
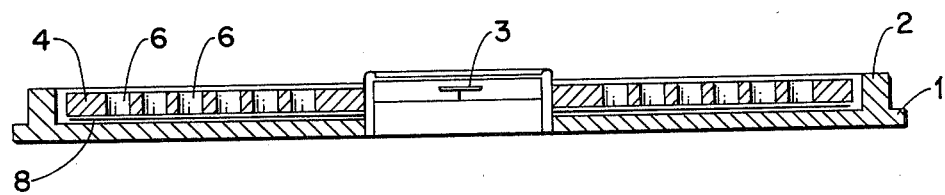
FIG. 2 is a side section view of FIG. 1.

In FIG. 1 and FIG. 2, a top view and cutaway side view are shown of one embodiment, comprising a base 1, shown here in square configuration. A circular flange 2 attached to or a part of base 1 protrudes outward forming a shallow, cylindrical cavity.

A compass device 3 is attached through the center of base 1, the compass element extending outward on the same side as the flange 2. A flat disc cover 4 of appropriate material removably fits into the cavity section formed by base 1 and flange 2. Beneath the flat disc cover 4 is one or more paper sheets 8.

The flat disc cover 4 in the embodiment of FIG. 1 has 144 marking holes 6, or six holes at each 15 degree interval around the compass element 3. The six holes at each interval are spaced so that the congregate form six concentric circles around the compass element. Each degree interval is shown marked in 15 degree increments from 0 or the true North direction. Said holes 6 are of sufficient size to permit a marking element (not shown) to mark onto the paper sheet 8 beneath disc cover 4. Additionally, there are alignment holes 9 in disc cover 4 which accomodate alignment pins 11 in the base 1. Hole 10 in disc cover 4 is fitted between holes 6 and is distinctive from the holes 6. Sheet 8 is marked with an identifying code through hole 10 as necessary in operation, as to be discussed later.

Figure 3:
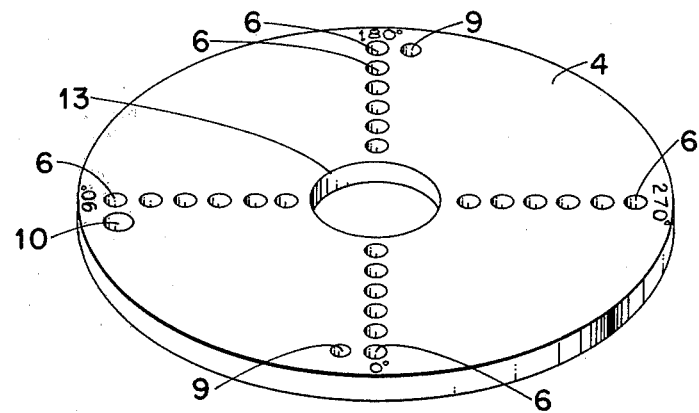
FIGS. 3, 4 and 5 are an exploded plan view of a second embodiment having a fixed compass.
Figure 4:
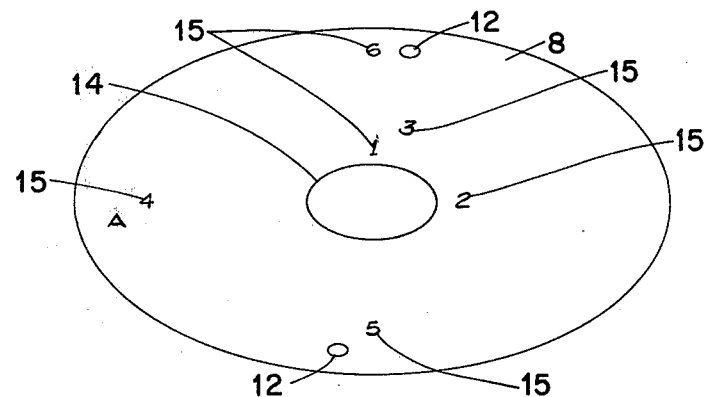
Figure 5:
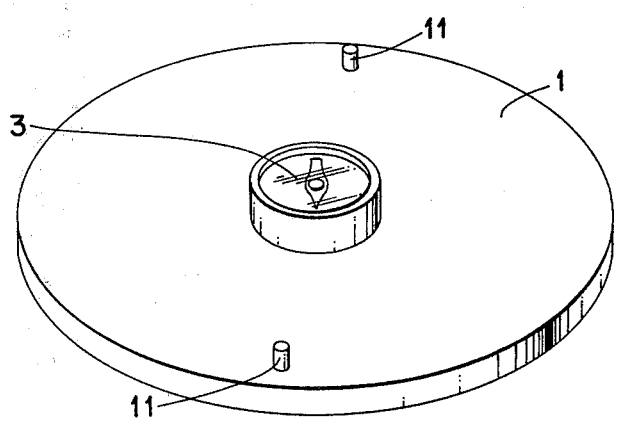
Figure 6:
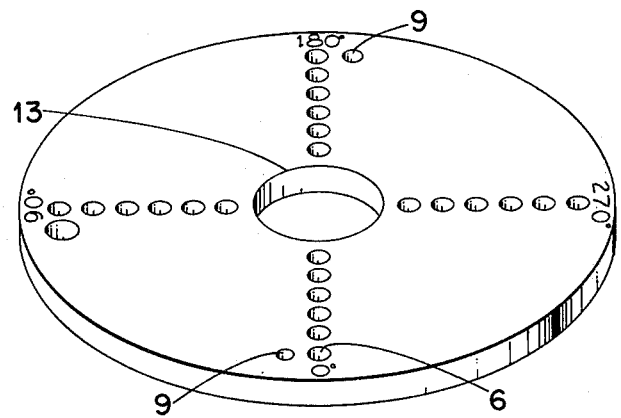
FIGS. 6 through 9 depict another embodiment wherein the compass element is rotatable.
Figure 7:
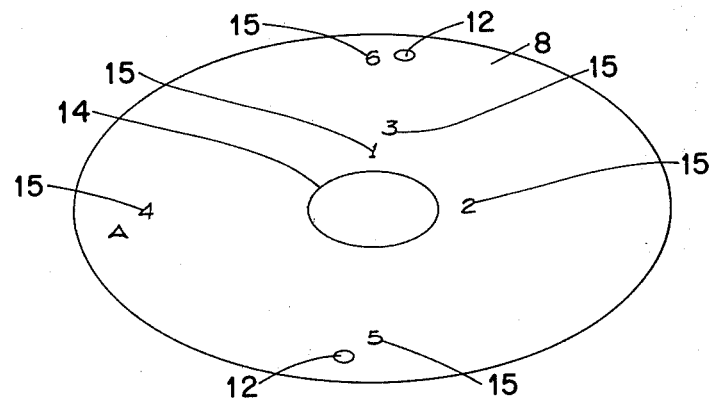
Figure 8:
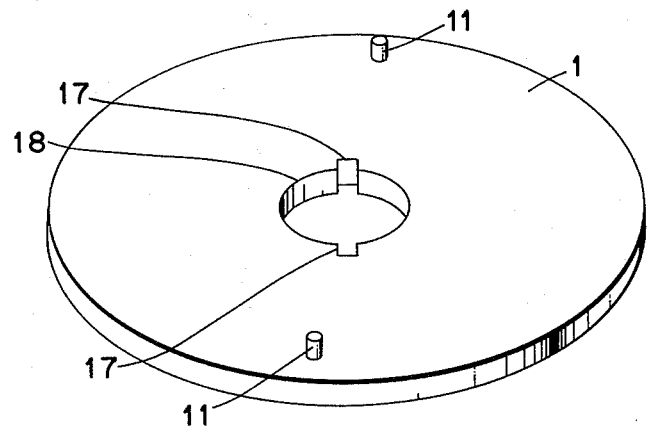
Figure 9:
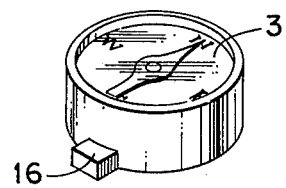

Referring now to the embodiment in FIGS. 3, 4 and 5, which embodiment is similar to FIGS. 1 and 2, a circular sheet 8 of a markable material such as paper stock is placed onto base 1, aligning the sheet around the compass by inserting alignment pins 11 through holes 12 in the sheet.

Disc cover 4 is placed atop the sheet, aligned with base 1 and the compass elements by inserting alignment pins 11 through guide holes 9 in the disc.

In operation of this embodiment, the user faces the desired direction of travel and rotates base 1 until the compass element 3 points to North. The sheet 8 could then be marked, or marked at a more appropriate time, with an identification symbol—here shown as "A". The symbol could represent a particular trek the user intended, or the first sheet of the trek, if more than six direction changes will occur.

After alignment of the device with true North, and while facing the direction the user desires to go, the user marks the distance to an intermediate geographical location in that direction through the first concentric circle hole 6 pointed in the desired travel direction. The notation is shown in FIG. 4 as "1", noted by reference numeral 15.

Upon arrival at the first-noted location, the user then aligns himself with the next desired direction and the compass element to North, and marks through the second concentric circle hole pointing in the desired direction the distance to the next geographical point—noted in FIG. 2 as "2".

This procedure is continued until the final point of destination is reached or the sixth concentric circle has been used. In the latter event, the user can replace the first sheet with a second sheet (to be coded "B", for example) and repeat the procedure until the final destination is arrived at.

In the embodiment of FIGS. 3, 4 and 5, the user is able to retrace his steps by first rotating the sheet 8 180°. The compass element 3 is aligned with North and the user positions himself with the direction of marking of the outermost circle—shown as "6" in FIG. 2—and notes the distance and/or locates the next landmark and proceeds in the direction of the marking. Upon arrival at the next geographical point or landmark, the user again aligns the compass element to North and the direction of the next inner concentric circle marking—"5" in FIG. 2—and proceeds the distance noted in the marking. The reverse procedure is repeated until the user has retraced his movements and returns to the starting point.

In the embodiment shown in FIGS. 6, 7, 8 and 9, the compass element is rotated, as opposed to sheet rotation in the above described embodiment. Compass element 3 is fitted snugly into recess 18 and is aligned with base 1 by 180° opposed notches 17. In this manner, the compass can be removed after final destination is reached as described above, rotated 180° and replaced. The user can then retrace his path by maintaining the original orientation of the sheet 8 and base 1. Pins 11 can be of different size or shape to prevent the sheets 8 from being placed incorrectly relative to the base 1. In all other manners, the return procedure is the same as described.

Figure 10:
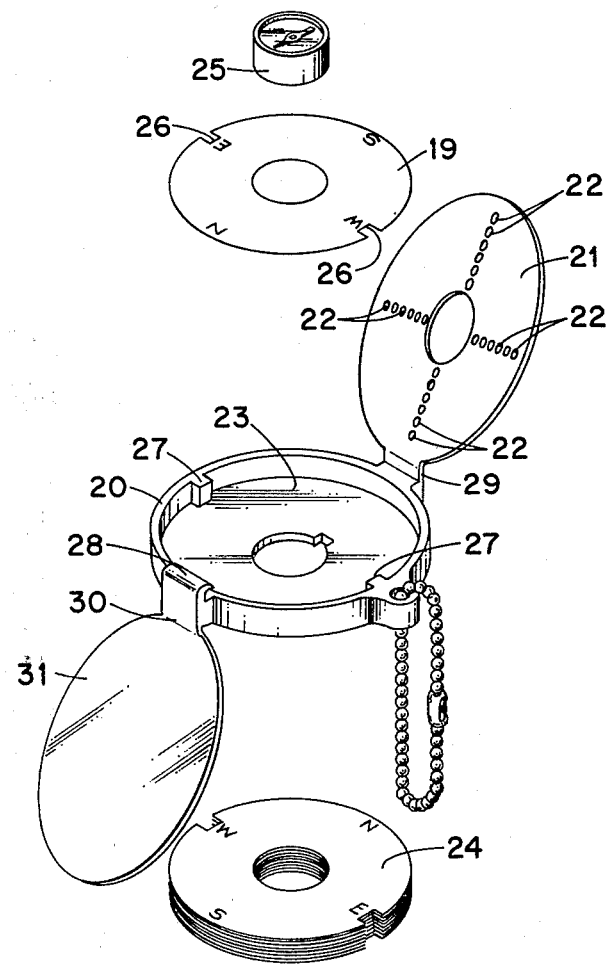
FIG. 10 is an exploded view of a one-piece, molded embodiment.
Figure 11:
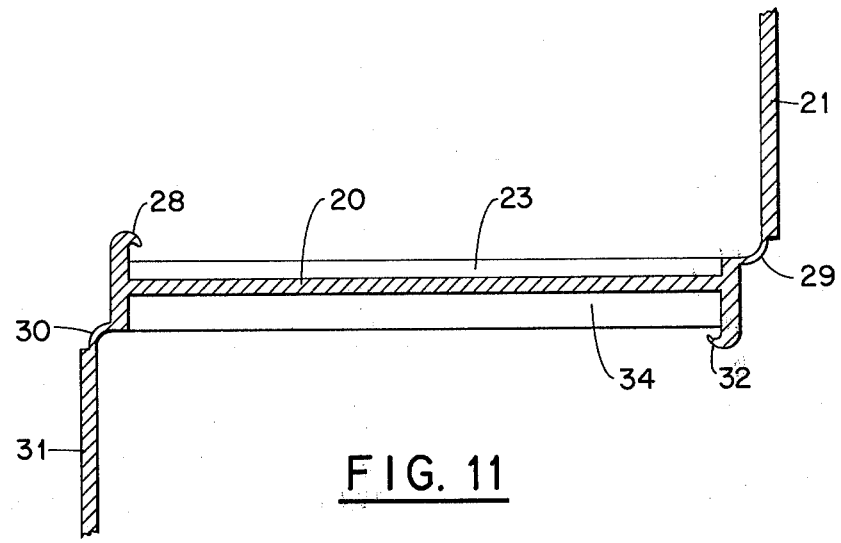
FIG. 11 is a cross-sectional view of the embodient of FIG. 10.

FIG. 10 constitutes an exploded view of a molded one-piece embodiment of the present invention. Housing 20 is molded in a single piece with top cover 21 and bottom cover 31. The molding material may be selected from any moldable polymer. The housing and covers may be flash or injection molded. A top cavity 23 and lower cavity 34 (see FIG. 11) are separated by a center section 35.

Extra sheets 24 are stored in the lower section and held in place by lower cover 31. A sheet 19 is inserted in the upper cavity 23 and positioned by fitting notches 26 to tabs 27 on the housing 20 as shown. Compass 25 is positioned in place. It is recognized that, in all respects, the operation of this embodiment may be by either of the two approaches described above—i.e., the compass may be fixed or rotatable 180 degrees. Further, the marking hole arrangement may be as shown in FIG. 1, for example.

Figure 12:
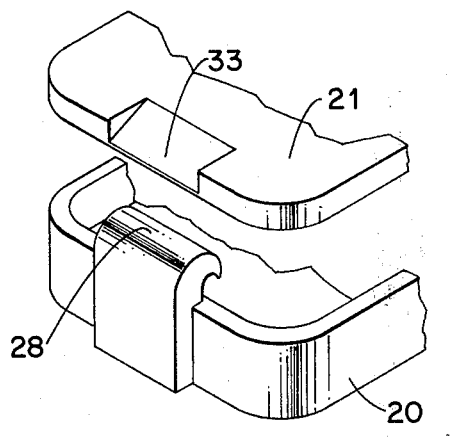
FIGS. 12 and 13 are detailed views of the latches and hinges of FIG. 10.
Figure 13:
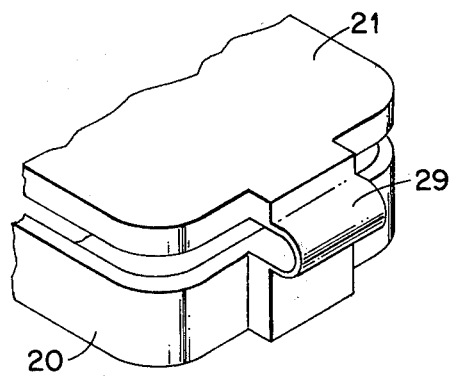

Both the top cover and bottom cover are similarly attached to housing 20 and are latched in similar manner. FIG. 12 and FIG. 13 detail the top cover hinge and latch arrangement, but are substantially similar to the bottom.

Top cover 21 is attached to housing 20 through a narrow polymer section that will flex easily through design and polymer selection. Cover 21 is held in closed position by latch 28. The cover may be released by insertion of a thumbnail or other instrument in the beveled section 33 of cover 21 and prying latch 28 backward to release cover 21.

The markings in selected holes by a user can be of any form or symbol. The markings may refer to time traveled in a particular selected direction at a given speed, distance traveled in a selected direction, or geographical landmark.

Further, the user may select techniques to be more accurate in directional marking than shown on the disc cover. This may be accomplished by rotation in an adjacent hole or adjacent holes on the same concentric circle. A user may also preselect the markings for the sheets by consulting a geographical map and chart directions and distances to recognizable landmarks on the map. These and other embodiments will be apparent to those skilled in the art from the above description.

What is claimed is:

1. A geographic travel aid device, comprising a single piece molded base, top cover and bottom cover, of synthetic polymeric material, said top cover and bottom cover being attached to said base by separate flexible sections of said polymeric material, said base having latch means for selectively holding said top cover and bottom cover in place; compass means attached to said base and visible through said top cover, said top cover having at lease two concentric rows of apertures, the apertures of adjacent rows being radially aligned relative to said compass means.

2. A method of traveling from one geographic location and returning to said location, utilizing a compass attached to a base having at least two concentric rings defined around said compass, said compass being incrementally rotatable 180° relative to said base, comprising the steps of aligning said base and compass with a selected reference direction and sighting relative to said base a first travel direction, marking a first concentric circle radially outward from the compass along the first travel direction with a first distance code, traveling a distance relative to said first code, realigning said base and compass relative to said selected reference direction and sighting relative to said base a second travel direction, marking a second concentric circle radially outward from the compass the second travel direction with a second travel code, traveling a distance relative to said second travel code, rotating said base relative to 180° said compass, aligning said base and compass relative to said selected reference direction, sighting radially outward from said compass in the direction of said second travel code and traveling a distance relative to said second travel code, realigning said base and compass relative to said selected reference direction, and sighting radially outward from said compass in the direction of said first travel code and traveling a distance relative to said first travel code.

* * * * *